United States Patent
Filsfils et al.

(10) Patent No.: US 12,363,005 B2
(45) Date of Patent: Jul. 15, 2025

(54) VIRTUAL NETWORK FUNCTION PROOF OF TRANSIT

(71) Applicant: Cisco Technology, Inc., San Jose, CA (US)

(72) Inventors: Clarence Filsfils, Brussels (BE); Ahmed Mohamed Ahmed Abdelsalam, L'Aquila (IT); Pablo Camarillo Garvia, Madrid (ES); Sonia Ben Ayed, Vanves (FR)

(*) Notice: Subject to any disclaimer, the term of this patent is extended or adjusted under 35 U.S.C. 154(b) by 3 days.

(21) Appl. No.: 18/422,801

(22) Filed: Jan. 25, 2024

(65) Prior Publication Data

US 2024/0163179 A1 May 16, 2024

Related U.S. Application Data

(63) Continuation of application No. 18/133,950, filed on Apr. 12, 2023, now Pat. No. 11,962,473.

(60) Provisional application No. 63/417,898, filed on Oct. 20, 2022.

(51) Int. Cl.
*G06F 15/173* (2006.01)
*H04L 41/0895* (2022.01)
*H04L 41/122* (2022.01)
*H04L 41/40* (2022.01)
*H04L 43/10* (2022.01)

(52) U.S. Cl.
CPC ........ *H04L 41/122* (2022.05); *H04L 41/0895* (2022.05); *H04L 41/40* (2022.05); *H04L 43/10* (2013.01)

(58) Field of Classification Search
CPC ... H04L 41/122; H04L 41/0895; H04L 41/40; H04L 43/10
See application file for complete search history.

(56) References Cited

U.S. PATENT DOCUMENTS

| | | |
|---|---|---|
| 2016/0315921 A1 | 10/2016 | Dara et al. |
| 2017/0237629 A1 | 8/2017 | Sobania |
| 2020/0162589 A1 | 5/2020 | Vijayadharan et al. |
| 2021/0144082 A1 | 5/2021 | Bisht et al. |

(Continued)

OTHER PUBLICATIONS

"MPLS WC 2022—Bell Canada: SRv6 Deployment—Service Programming Reduces Cost", <<https://www.segment-routing.net/conferences/MPLS-WC-2022-Daniel-Bernier-Jesper-Eriksson/>>, retrieved on Nov. 15, 2023, 2 Pages.

(Continued)

*Primary Examiner* — Joseph R Maniwang
(74) *Attorney, Agent, or Firm* — Lee & Hayes, P.C.

(57) ABSTRACT

Techniques for monitoring data transport in a network virtualization function (NVF) chain. A path tracing packet is generated having a Midpoint Compressed Data (MCD) to collect path tracing information of the NVF chain. The NVF node is configured to record an MCD containing Wide Local Path Tracing Identification (WL PT ID). The WL PT ID includes a first field having a value that indicates that a non-standard path tracing format is to be used and has a second field that indicates a particular path tracing format to be used. The path tracing packet is passed through the NVF chain and is then received back again after passing through the NVF chain. Data collected by the path tracing packet is analyzed to determine which NVF nodes the path tracing packet passed through, and the amount of time taken for the path tracing packet to pass through, the NVF chain.

20 Claims, 7 Drawing Sheets

(56) References Cited

U.S. PATENT DOCUMENTS

2021/0144091 A1   5/2021   C H et al.
2021/0250299 A1   8/2021   Liu et al.

OTHER PUBLICATIONS

Brockners et al., "Proof of Transit", <<https://datatracker.ietf.org/doc/html/draft-ietf-sfc-proof-of-transit>>, retrieved on Nov. 15, 2023. 32 Pages.

Clad et al., "Service Programming with Segment Routing", <<https://datatracker.ietf.org/doc/draft-ietf-spring-sr-service-programming/>>, Retrieved on Nov. 15, 2023. 27 pages.

Filsfils et al., "Path Tracing in SRv6 networks", <<https://datatracker.ietf.org/doc/draft-filsfils-spring-path-tracing/>>, Retrieved on Nov. 15, 2023, 13 Pages.

Office Action for U.S. Appl. No. 18/133,950, mailed on Aug. 16, 2023, Inventor #1 Clarence Filsfils, "Virtual Network Function Proof of Transit," 7 pages.

312 →

| MCD1 402 | | | | | | | | | MCD2 404 | | | | | | |
|---|---|---|---|---|---|---|---|---|---|---|---|---|---|---|---|
| X1 | Y1 | Z1 | P1 | Q1 | N1 | X2 | Y2 | Z2 | P2 | Q2 | N2 |
| 408 | 410 | NFV-NODE-ID | | | | NFV-IN-TS | | NFV-IN-PT-ID | | NFV-OUT-PT-ID | |

| MCDn 406 | | | | | |
|---|---|---|---|---|---|
| Xn | Yn | Zn | Pn | Qn | Nn |
| PT IFACE ID | | | NFV-OUT-TS | | LOAD |

```
RECEIVE A PATH TRACING PACKET HAVING EXTENDED MIDPOINT
COMPRESSED DATA (MCD) CONFIGURED TO INCLUDE A WIDE
LOCAL PATH TRACING IDENTIFICATION (WL PT ID) TO COLLECT
PATH TRACING INFORMATION FROM NODES OF A NETWORK
FUNCTION VIRTUALIZATION (NFV) CHAIN
502
```

↓

```
PASS PATH TRACING PACKET THROUGH AN NFV CHAIN
504
```

↓

```
CONFIGURING THE NFV NODE OR AN SRv6 PROXY TO INCLUDE
ITS MIDPOINT COMPRESSED DATA (MCD) IN THE MCD STACK OF
THE PATH TRACING PACKET, WHEREIN THE MCD INCLUDES A
WIDE LOCAL PATH TRACING IDENTIFICATION (WL PT ID) WHICH
PROVIDES AN EXTENSION TO A PATH TRACING DATAPLANE TO
ALLOW COLLECTION OF PROOF OF TRANSIT OF NODES IN THE
NFV CHAIN
506
```

↓

```
USING THE PATH TRACING PACKET TO COLLECT INFORMATION
FROM NODES OF THE NFV CHAIN
508
```

↓

```
ANALYZING THE COLLECTED INFORMATION TO DETERMINE WHICH
NFV NODES THE PATH TRACING PACKET PASSED THROUGH AND
AN AMOUNT OF TIME TAKEN FOR THE PATH TRACING PACKET TO
PASS THROUGH THE NFV CHAIN
510
```

FIG. 5

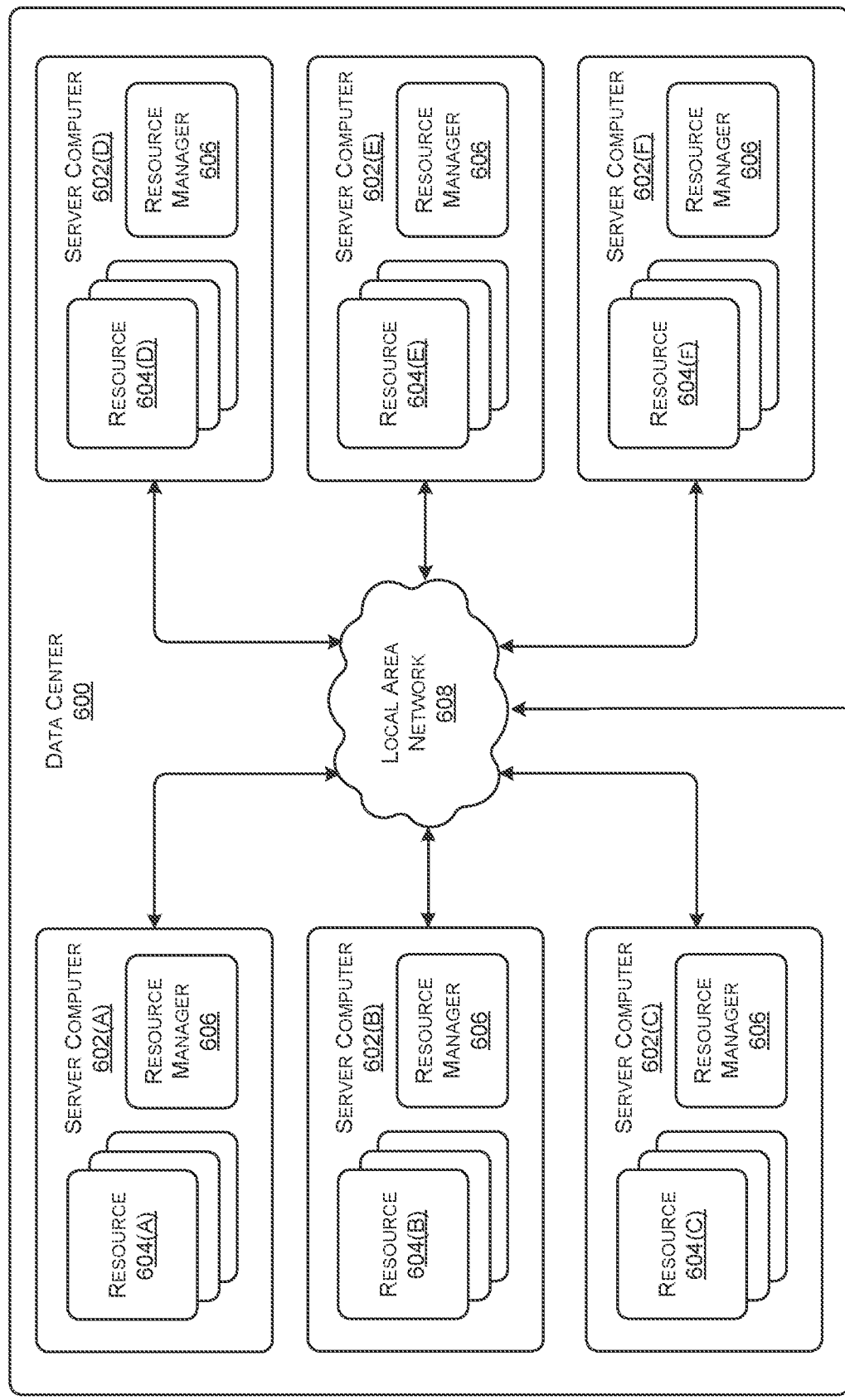

VIRTUAL NETWORK FUNCTION PROOF OF TRANSIT

RELATED APPLICATIONS

This application claims priority to and is a continuation of U.S. patent application Ser. No. 18/133,950, filed on Apr. 12, 2023, which claims priority to U.S. Provisional Patent Application No. 63/417,898, filed Oct. 20, 2022, the entire contents of which are incorporated herein by reference.

TECHNICAL FIELD

The present disclosure relates generally to verification of data traffic through Virtual Network Functions (VNF) of a Network Function Virtualization (NFV) chain.

BACKGROUND

Network function virtualization (NFV) is a way to virtualize network services such as routers, firewalls, load balancers and other functions that have traditionally run on proprietary hardware. These services can be packaged as virtual machines on commodity hardware, which allows service providers to run their networks on standard servers instead of proprietary ones. It is one of the components of a cloud-based service that has been used, for example, in the telecommunications industry.

With Network Function Virtualization, dedicated hardware is not required for each network function. Network function virtualization improves scalability and agility by allowing service providers to deliver new network services and applications on demand, without requiring additional hardware resources.

A similar development in computer network is Software Defined Networking. Software Defined Networking is not independent of Network Function Virtualization, but they do have similarities to one another. Both rely on virtualization and use network abstraction, but how they separate functions and abstract resources is different. Software Defined Networking separates network forwarding functions from network control functions with the goal of creating a network that is centrally manageable and programmable. Network Defined Virtualization abstracts network functions from hardware. Network Function Virtualization supports Software Defined Networking by providing the infrastructure on which Software Define Networking can run. Network Function Virtualization and Software Defined networking can be used together, depending upon what an entity wants to accomplish, and both use commodity hardware. With Network function Virtualization and Software Defined Networking, an entity can create a network architecture that is more flexible, programmable, and uses resources more efficiently.

With Network Function Virtualization, service providers can run network functions on standard hardware instead of dedicated hardware. Also, because the network functions a virtualized, multiple functions can be run on a single server. This means that less physical hardware is needed, which allows for resource consolidation that results in physical space, power, and overall cost reductions.

Network Function Virtualization gives providers the flexibility to run Virtual Network Functions across different servers or move them around as needed when demand changes. This flexibility lets service providers deliver services and applications faster. For example, if a customer requests a new network function, they can create a new Virtual Machine to handle that request. If the function is no longer needed, the Virtual Machine can be shut down. This can also be a low-risk way to test the value of a potential new service.

Segment Routing Services provide an added value to operators through a set of cloud native applications that help operators monitor and manage their networks. The Segment Routing Services collect both control plane and data plane information, correlate information from multiple sources, analyze them, and highlight the hot spots or trouble areas of the network to operators.

A Network Function Virtualization chain is composed of a sequence of Virtual Network Functions that a data packet has to go through. In SRv6, each Virtual Network Function is assigned an SRv6 Segment Identifier (SID) and the Network Function Virtualization chain is represented as a SID list that combines the SIDS of the Virtual Network Functions that are part of the chain.

A Network Function Virtualization chain is composed of one or more Network Functions which are typically deployed in a Network Function Virtualization Data Center. Packets are classified and steered in a given Network Function Virtualization chain. However, there is no guarantee that the steered packet goes through the right Network Function in the Network Function Virtualization Data Center. The problem becomes even more challenging in a virtual environment where the Network Functions are deployed as Virtual Machines and or Containers. In this virtual environment, the Network Function Virtualization chains are created dynamically, which makes it impossible to have any certainty as to whether the packet has traversed the correct Virtual Network Function. In addition, it is impossible to know how long the packet took for Network Virtualization Function processing.

In the case of SRv6, the transport network learns (using control plane protocols such as BGP or through an API) the Segment ID (SID) associated with the Virtual Network Function. The transport networks build a SID list to realize a given Network Function Virtualization chain. In some cases, the transport may learn a single SRv6 Binding SID which will resolve in a SID list when the packet gets to the Network Function Virtualization Data Center. The transport network steers the packet in the SID list or the binding SID of the chain. In either way, there is no way to detect whether the steered packets go through the right chain and how long it takes them to go through the chain. The problem is even more challenging when the Virtual Network Functions are SR unaware which runs behind an SRv6 proxy. The packet is steered from the SRv6 proxy which removes the SRv6 encapsulation and sends the inner packet to the list of the Virtual Network Functions.

After the packet has been processed by the Virtual Network Function, the SRv6 proxy reapplies the SRv6 encapsulation again to the packet. The operator is completely blind regarding the forwarding between the SRv6 proxy and the SR unaware VNF s. There is no way to detect whether the SRv6 Proxy has executed the chain correctly and delivered the packet to the right Virtual Network Functions or not. Therefore, there remains a need for a solution for determining whether a packet in a Virtual Network Function chain has processed by the desired Virtual Network Functions of a Network Function Virtualization Chain.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 shows an example of an MCD stack of a path tracing data packet according to an embodiment.

FIG. 5 shows a flowchart illustrating a process according to an embodiment.

FIG. 6 illustrates a computing system diagram illustrating a configuration for a data center that can be utilized to implement aspects of the technologies disclosed herein.

DESCRIPTION OF EXAMPLE EMBODIMENTS

Overview

Figure 1:
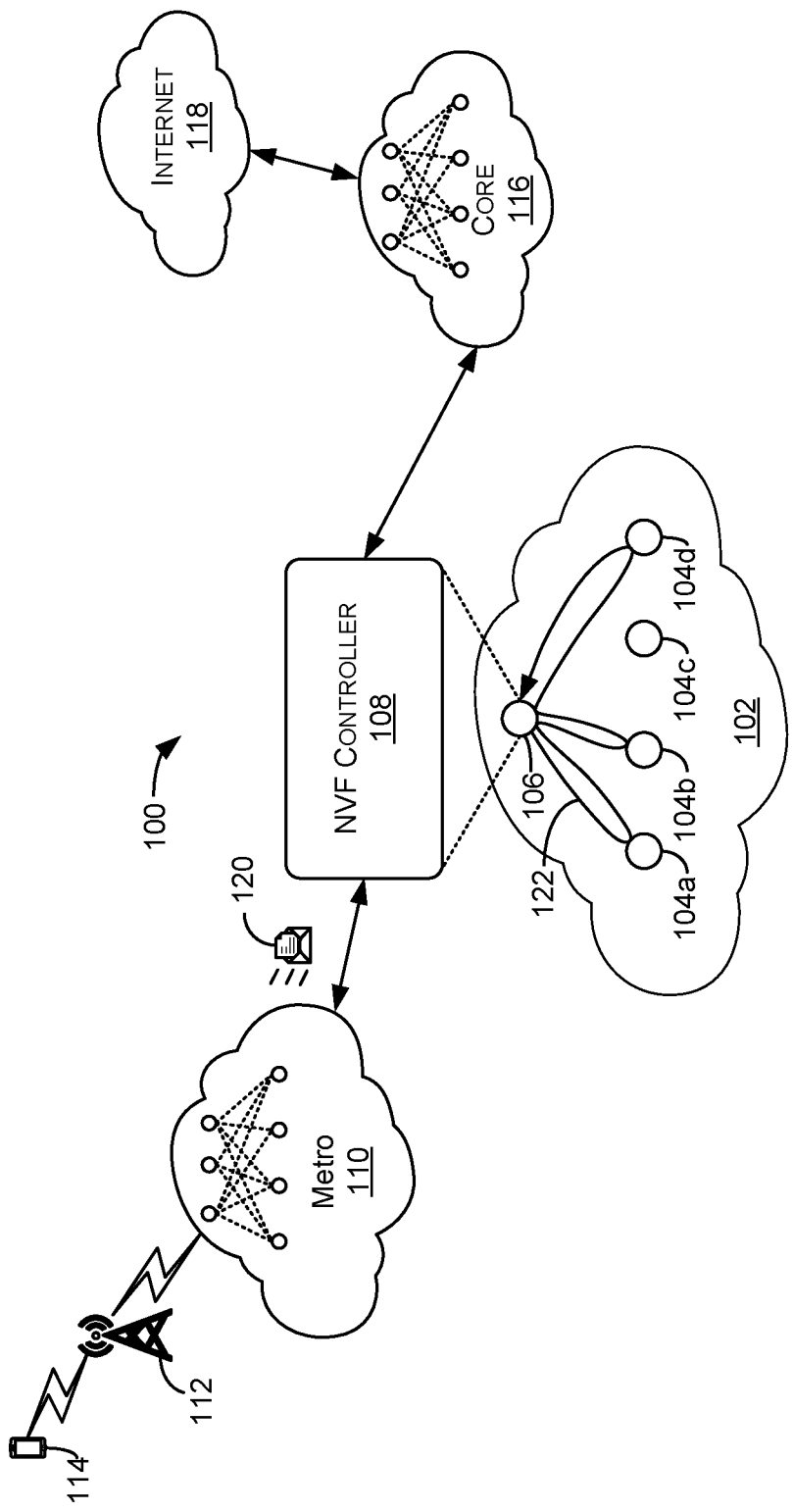
FIG. 1 shows a schematic illustration of a network environment in which an embodiment can be implemented.

This disclosure describes techniques for monitoring data transport in a network function virtualization chain. A path tracing packet is received, the path tracing packet having a Midpoint Compressed Data (MCD) stack to collect path tracing information from nodes of a Network Function Virtualization (NFV) chain. The NFV node or the SRv6 Proxy is configured to record its Midpoint Compressed Data (MCD). The MCD include a Wide Local Path Tracing Identification (WL PT ID) which provides an extension to a path tracing dataplane to allow collection of proof of transit of nodes in the NFV chain. The WL PT ID includes a first field having a value that indicates that a non-standard path tracing format is to be used and has a second field that indicates a particular path tracing format to be used. In this application one WL PT ID type is defined for proof of transit in a network function virtualization chain. The path tracing packet is passed through one or more nodes (or SRv6 Proxies) of the NFV chain. The NFV node (or the SRv6 Proxy) records its MCD containing the WL PT ID. The path tracing information collected in the path tracing packet is analyzed to determine which NFV nodes and NFV chain the path tracing packet passed through and to determine an amount of time taken for the path tracing packet to pass through the NFV chain.

Example Embodiments

Path tracing provides a record of the path that a data packet takes through a network as a sequency of interface IDs. In addition, it provides a record of end-to-end delay, per-hop delay, per-hop load on each egress interface along the packet delivery path.

Path tracing allows tracing of 14 hops with only a 40 bytes IPv6 hop-by-hop header. Path tracing supports fine-grained timestamps. It has been designed for line-rate hardware implementation in the base pipeline of a network. Path tracing is applicable to both SR-MPLS, as well as SRv6 protocols.

Equal Cost Multi-Path (ECMP) data routing is of key importance in current IP networks. It provides both efficiency and resilience. Between any two nodes in a network there can be several ECMP paths. However, the detecting and troubleshooting of these ECMP paths remains a big challenge. A Forwarding Information Base (FIB) corruption or FIB misconfiguration at any node is one among many issues that can occur that may lead packets to follow a non-ECMP path.

Path Tracing reveals all unknowns about ECMP. It allows operators to detect the currently available ECMP paths. They can also detect the ECMP paths that were available at a given time in the past. With path tracing, the operator will be able to know whether the packets are following an ECMP path or not. They can also detect where the packets are drifting from the ECMP paths.

Path tracing achieves all of this by collecting only 3 bytes of data from each hop on the packet path. Path tracing is implemented at line-rate in the hardware forwarding pipeline. It provides the most accurate information about the packet path. There is no need to offload packet processing to CPU or NPU co-processors because they will not record the actual packet experience.

Network Function Virtualization (NFV) allows for the separation of communication services from dedicated hardware, such as routers and firewalls. This separation means that network operations can provide new services dynamically and without installing new hardware. Deploying network components with network function virtualization takes hours instead of month as would be the case with traditional networking.

In addition, the virtualized services can run on less expensive, generic servers instead of proprietary hardware. Other benefits of NFV include the ability to "pay-as-you-go", which can reduce costs, allowing a business to pay only for what they need. Because NFV runs on virtual machines instead of physical machines, fewer appliances are necessary and operational costs are lower. In addition, scaling of a network architecture with virtual machines is faster and easier and does not require the purchase of additional hardware.

Network Function Virtualization (NFV) replaces the functionality provided by individual hardware networking components. This means that virtual machines run software that accomplishes the same networking functions as the traditional hardware. Functions such as load balancing, routing, firewall security and other functions are all performed by software instead of hardware components. A hypervisor or software-defined networking controller allows network engineers to program all of the different segments of the virtual network and even automate the provisioning of the network. IT managers can configure various aspects of the network functionality through one user interface in minutes.

Many service providers feel that the benefits of network NFV outweigh the risks. With traditional hardware-based networks, network managers have to purchase dedicated hardware devices and manually configure and connect them to build a network. This is time consuming and requires specialized networking expertise.

NFV allows virtual network function to run on a standard generic server, controlled by a hypervisor, which is far less expensive than purchasing proprietary hardware devices. Network configuration and management is much simpler with a virtualized network. Network functionality can be changed or added on demand, because the network runs on virtual machines that are easily provisioned and managed.

NFV makes a network more responsive and flexible, and easily scalable. It can accelerate time to market and significantly reduce equipment costs. However, there are security risks, and NFV security concerns have proven to be a hurdle for wide adoption among telecommunications providers. One such concern is the lack of effectiveness of physical security controls. Virtualizing network components increases their vulnerability to new kinds of attacks compared with physical equipment that is locked in a data center. Another such concern is that NFV makes malware more difficult to isolate and contain. It is easier for malware to travel among virtual components that are all running off of one virtual machine than between hardware components that can be isolated or physically separated. Another security challenge presented by NFV is that network traffic is less transparent. Traditional traffic monitoring tools have a hard time spotting potentially malicious anomalies within network traffic that is traveling east-west between virtual machines. Therefore, NFV requires more fine-grained security solutions. Complex layers require multiple forms of security when using NFV. NFV environments are inherently complex, with multiple layers that are hard to secure with blanket security policies.

In a traditional network architecture, individual proprietary hardware devices such as routers, switches, gateways, firewalls, load balancers and intrusion detection systems all carry out different networking tasks. A virtualized network replaces these pieces of equipment with software applications that run on virtual machines to perform networking tasks. An NFV architecture includes three parts. First, an NFV includes a centralized virtual network infrastructure. An NFV infrastructure may be based on either a container management platform or a hypervisor that abstracts the computation, storage and networking resources. Second, an NFV includes software applications. Software replaces the hardware components of a traditional network architecture to deliver the different types of network functionality (virtualized network functions). Third and NFV includes a framework. A framework (often known as Management, Automation and Network Orchestration (MANO)) is needed to manage the infrastructure and provision network functionality.

Launching new network services used to be a cumbersome process that required space and power for additional hardware boxes. As energy and space costs increased and the number of skilled networking hardware engineers decreased, the European Telecommunications Standards Institute (ETSI) committee turned to NFV to solve both of these problems. NFV eliminates the need for physical space for hardware appliances and does not require intensive networking experience to configure and manage.

While NFV separates networking services from dedicated hardware appliances, software defined networking or SDN, separates the network control functions such as routing, policy definition and appliances from network forwarding functions. With SDN, a virtual network control plane decides where to send traffic, enabling entire networks to be programmed through one user interface. SDN allows network control functions to be automated, which makes it possible for the network to respond quickly to dynamic workloads. A software-defined network can sit on top of either a virtual network or a physical network, but a virtual network does not require SDN to operate. Both SDN and NFV rely on virtualization technology to function.

Segment Routing Services provide an added value to network operators through a set of cloud native applications such as the above described NFV. The Segment Routing Services help operators to monitor and manage their networks. The Segment Routing Services collect both control plane and data plane information, correlate information from multiple sources, analyze them, and highlight trouble areas regarding the network to operators. A Network Function Virtualization chain (NFV chain) includes a sequence of Virtual Network Functions (NVFs) through which a packet can traverse. In SRv6, each VNF is assigned an SRv6 Segment ID (SID) and the NFV chain is represented as a SID list that combines the SIDs of the VNFs that are part of the chain. As discussed above, NFV chaining provides a significant reduction in service creation cost.

An NFV chain is composed of one or more Network Functions which are typically deployed in an NFV Data Center (NFV DC). Data packets are classified and steered in a given NFV chain. However, there are no guarantees as to whether the steered data packets are going through the correct network functions in the NFV DC. The problem gets more complex in a virtual environment where the Network Functions are deployed as virtual machines and or containers. In such a virtual environment, the NFV chains are created dynamically which makes it impossible to have any certainty as to whether the packet has traversed the correct VNF. In addition, it is impossible to know how long the packet took for NFV processing.

In the case of SRv6 the transport network learns the SID associated with the VNF. The transport networks build a SID list to realize a given NFV chain. In some cases, the transport may learn a single SRv6 binding SID which will resolve in a SID List when the packet gets to the NFV Data Center. The transport steers the packet in the SID List (or the binding SID) of the chain. Either way, there is no way to detect whether the packets went through the desired chain or how long it takes them to go through the chain. The problem is even more challenging when the VNFs run behind an SRv6 proxy. The packet is steered from the transport network to the SRv6 Proxy which removes the SRv6 encapsulation and sends the inner packet to the list of VNFs. After the packet has been processed by the VNF, the SRv6 Proxy reapplies the SRv6 encapsulation again to the packet. The operator is completely blind as to the forwarding between the SRv6 proxy and the VNFs. There is no way to detect whether the SRv6 proxy has executed the chain correctly and delivered the packet to the correct VNFs or not.

Techniques described herein below provide a solution to the above-described challenge by leveraging a path tracing solution as well as Software Defined Networking Controller (SDN Controller) capabilities to provide an SDN solution (analytics application) that fully identifies a packet's trajectory through an SRv6 chain as well as the time taken for the NFV processing.

The solution defines both data-plane and Software Defined Networking Analytics sides. In the data-plane, a new path tracing behavior is defined which extends the Path Tracing Data-Plane to record the required information to detect the packet trajectory through the NFV chain as well as the time taken for the NFV processing. On the analytics side, an SDN Application Controller is built that analyzes the data-plane information (collected using the new Path Tracing data-plane behavior) to show the packet trajectory through the NFV chain as well as the time taken for the NFV processing.

In regular path tracing (defined in https://datatracker.ietf.org/doc/draft-filsfils-spring-path-tracing/), each midpoint records three bytes of information known as "Midpoint Compressed Data" (MCD). The MCD is composed of 12 bits of PT IFACE ID, 8 bits of Truncated Timestamp (TTS), and 4 bits of Interface Load. The data-plane part of the proposed solution extends the path tracing data-plane by defining the Wide Local PT ID (WL-PT-ID) through which the node can record any amount of data needed. WL-PT-ID can be used to collect the data needed to solve the NFV proof of transit problem. The WL-PT-ID can be leveraged to solve many other use-cases that require collecting more Path Tracing data from the data-plane.

The solution defines a special value (0xF) in the first field of the PT IFACE ID to indicate that the collected data must be interpreted by the SDN Application as WL-PT-ID. The WL-PT-ID can be followed by a Type field to indicate the particular format of the following bits in the same MCD as well as the following MCDs. The Midpoint can use the remaining bit of the same MCD as well as the following MCDs to record data defined by the Type field. One Type can be allocated in WL-PT-ID for the NFV proof of transit use-case.

The SDN Application collects the probes and processes the MCD according to the value of the first field in the PT IFACE ID. If the value is 0xF, the SDN Application processes the Type field after, and processes the remaining bits of the MCD as well as the following MCDs according to the type. This solution can seamlessly combine the Path Tracing information collected for NFV Chain trajectory with the Path Tracing data collected from the transport, Core, Data-Center network to provide a full end-to-end characterization of the packet trajectory through the transport, Core, Datacenter and the NFV.

FIG. 1 is a diagram of an environment 100 in which an embodiment described herein can be implemented. The environment 100 can include a network 102 that can be a data center and which can include a plurality of network virtualization functions 104a, 104b, 104c, 104d. One or more nodes 106 of the network 102 can provide a Network Function Virtualization Controller (NVF Controller) 108. The Network Function Virtualization Controller 108 can be part of a Data Center Controller configured to manage a data center network such as the network 102.

The network 102 and the controller 108 can be in communication with one or more other networks. For example, in one embodiment, the network 102 can be in communication with a network (Metro) 110, which in one embodiment can be a wireless communication network and which can be in communication with one or more wireless devices such as cell towers 112 and or wireless devices such as cell phones 114. The network 102 can also be in connection with other networks such as a core network 116 and/or a Wide Area Network such as the Internet 118.

In one embodiment, a Metro network 110 and Core Network 116 can be networks such as data center and be part of a wireless service provider network infrastructure. For example, in implementing software virtualization and cloud-based services, the core network 116 and Metro network 110 can be implemented onto a distributed set of data centers that provide service agility, centralized control, and software upgrades. Software Defined Networking (SDN), Network Function Virtualization (NFV), cloud, and open ecosystems are likely to be foundations of 5G wireless services and there is an ongoing discussion about how to take advantage of these advances into new network architectures.

An adaptive network solution framework will be necessary for interfacing with both LTE and new air interface evolutions such as Cloud, SDN and NFV are developing technologies in mobile network design. As the three-tier hierarchy (access, forwarding, and control) of network architecture is being replaced by flatter architectures, virtualized application software is replacing discrete network elements and network infrastructure is becoming more programmable. With SDN, the network will dynamically adapt itself to provide the connectivity services that best serve the application and a better approach will adapt itself to provide the connectivity services that best serve the application. A better approach will eventually produce networks that are much more flexible in providing new services and monetizing the network, as well as being more efficient in their use of resources.

In one embodiment, the Metropolitan (Metro) network (or Metropolitan Area Network (MAN)) 110 is a computer network that connects computers and devices within a metropolitan area, which could be a single large city, multiple cities and towns or any given large area with multiple buildings. A Metro network 110 is larger than a Local Area Network (LAN) but is smaller than a Wide Area Network (WAN) (such as the Internet). Metro networks 110 do not have to be in urban areas. The term "metropolitan" implies the size of the network, not the demographics of the area that it serves.

A core network, such as the core network 116 is a telecommunication networks core part, which offers numerous services to customers who are interconnected by the access network. Its key function is to direct telephone calls over the public-switched telephone network. In general, the term "core" network signifies the highly functional communication facilities that interconnect primary nodes. The core network 116 delivers routes to exchange information among various sub-networks. When it comes to enterprise networks that serve a single organization, the term "backbone" is often used instead of core network, whereas when used with service providers the term "core" network is prominent.

In one embodiment, the network 102 is a Data Center which is configured to implement various virtual network functions 104. In one embodiment, at least one node of the network 102 provides a Network Function Virtualization Controller (NFV Controller) 108. The NVF Controller 108 can also be part of a Datacenter Controller (DC) which can be used to manage data flow through the network 102 such as to detect network problems and prevent loss of data transfer and maximize efficiently of data transport. The NVF Controller 108 can include software, hardware circuitry and/or logic for managing the network virtualization functions 104 based on the needs of data packets from one or more of the networks 110, 116, 118. The NVF Controller 108 can receive a data packet and can route the data packet through various network virtualization functions 104 as determined by the needs of the particular data packet. After routing the data packet through the desired network virtualization functions 104, the node 106 providing the NVF Controller 108 can generate or receive the data packet and forward it to the desired destination such as within one of the networks 110, 116, 118. The path that the data packet takes through the various network virtualization function nodes 104a-d can be referred to as a network virtualization function chain (NVF Chain) 122. In the example shown in FIG. 1, the NVF Chain 122 only includes network virtualization nodes 104a, 104b and 104d, because those are the nodes are network the NVF Controller has determined, based on information from the data packet 120, that those are the only network virtualization functions required for the data packet 120.

However, as discussed above, it can be difficult to determine which network virtualization nodes 104 the data packet has actually passed through along the NVF Chain 122 and how long it has taken for the data packet to pass through the each of the nodes 104 along the Network Virtualization Chain 122. A data packet 120 is steered through a desired NFV chain 122. However, there is no guarantee as to whether the packet 120 went through the right network function in the NFV Chain 122. This challenge becomes more complex in a virtual environment where the network functions 104 are deployed as Virtual Machines (VMs) and/or as containers. In such a virtual environment, the NFV chains are created dynamically which makes it impossible to have a certainty as to whether the packet 120 has traversed the right VNF 104 using standard path tracing techniques. In addition, it is impossible to know how long the packet took to traverse the NVF Chain 122.

In the case of SRv6, the transport network learns the Segment ID (SID) associated with the VNF. The transport networks build an SID list to realize a given NFV chain. In some cases, the transport may learn a single SRv6 Binding SID which will resolve in an SID list when the packet gets to the NFV Data Center (e.g. network 102). The transport network steers the packet in the SID list or the binding SID of the chain 122. Either way, there is no way to detect whether the steered packets go through the right chain and how long it takes them to go through the chain. The problem is more challenging when the VNFs are Segment Routing unaware and running behind an SRv6 proxy. The packet steered from the transport network to the SRv6 proxy reapplies the SRv6 encapsulation again to the packet. The operator is completely blind as to the forwarding between the SRv6 proxy and the source route unaware VNFs 104. There is no way to detect whether the SRv6 proxies have executed the chain correctly and delivered the packet to the right VNFs or not.

Figure 2:
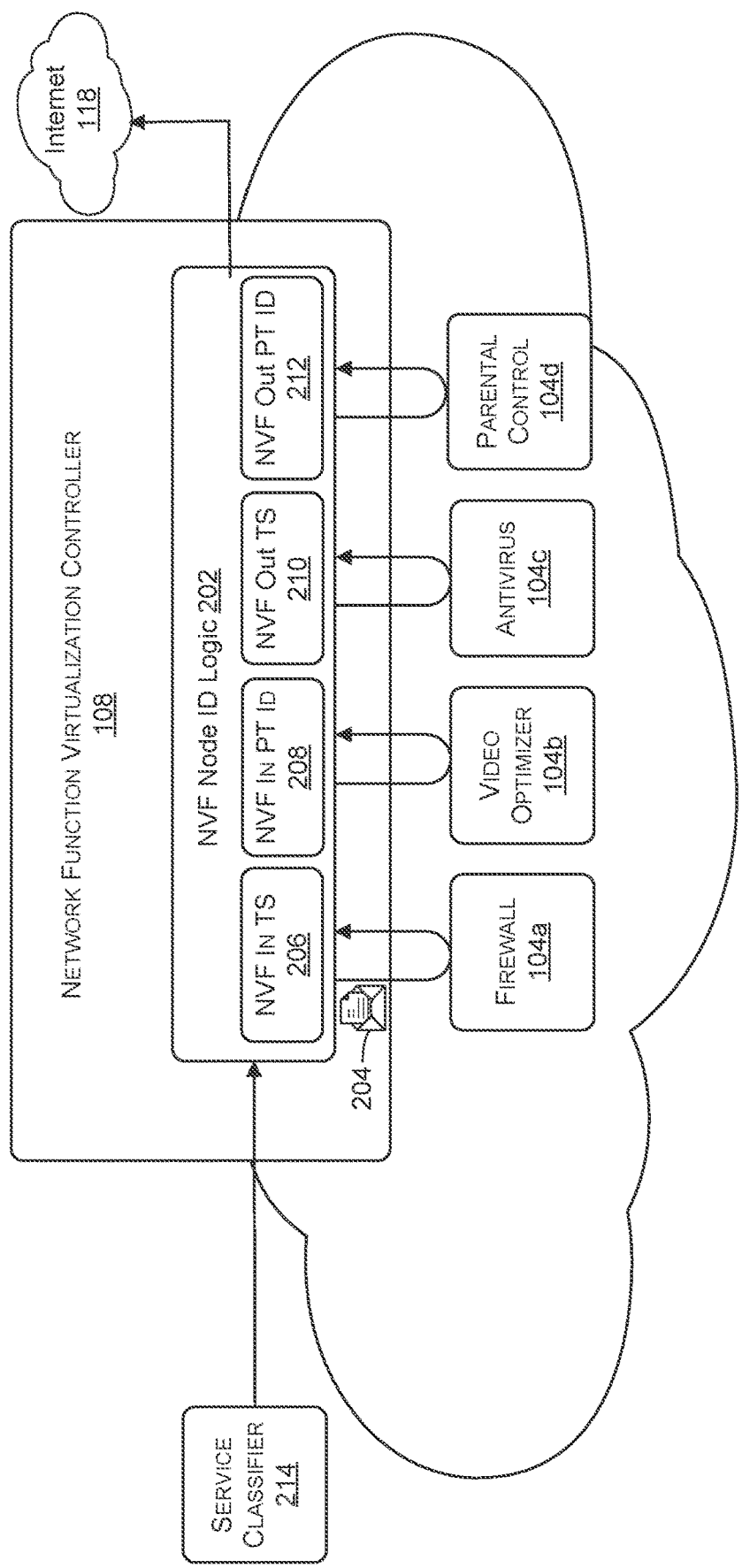
FIG. 2 shows a schematic showing a network function virtualization controller managing a network virtualization chain according to an embodiment.

Techniques as described herein implement a unique path tracing process using a new path tracing behavior to determine the path of the actual NVF chain 122, which NFV nodes 104 the data packet has passed through, and the time taken for a data packet to pass through the NVF chain 122. With reference now to FIG. 2, an embodiment of a Network Function Virtualization Controller 108 is shown. The Network Function Virtualization Controller 108 includes computer software and/or hardware for receiving and analyzing NVF Node ID data 202. The NVF Node ID information can be collected using a custom MCD recorded in a Path Tracing Packet 204, which will be described in greater detail herein below. In one embodiment, the NFV Controller 108 can be functional to generate the modified path Tracing Packet 204 and includes logic and/or circuitry for recognizing and implementing the packet 204 to collect data regarding various VNFs 104 through which the packet 202 has passed. In another embodiment the packet 204 (as well as other data packets not shown) can be received from a Service Classifier 214 having logic and/or circuitry configured to determine which services 104 to apply.

The NFV Node ID logic 202 includes logic that uses data collected by the Path Tracing Packet 204 to determine various data regarding various NVFs 104 through which the Path Tracing Packet 204 has traversed. In one embodiment, that data can include: an NVF In Time Stamp (NVF IN TS 206); an NVF Path Tracing ID (NVF IN PT ID 208); an NVF Out Time Stamp 210 (NVF OUT TS 210); and an NVF Out Path Tracing ID (NVF OUT PT ID 212). In one embodiment, the path tracing data packet collects each of these values (NVF IN TS 206; NVF IN PT ID 208; NVF OUT TS 210; and NVF OUT PT ID 212 for each of the NVFs 104 of the NFV chain. In another embodiment, the path tracing data packet collects each of these values (NVF IN TS 206; NVF IN PT ID 208; NVF OUT TS 210; and NVF OUT PT ID 212 once per the whole the NFV chain. By way of example, in one embodiment, the Network Virtualization Functions (NVFs) can be various services such as a Firewall 104a, a Video Optimizer 104b, Antivirus 104c, and Parental Controls 104d.

In one embodiment, the NFV network 102 is managed by a controller (such as the controller 108) which assigns a path tracing ID to a plurality of interfaces connected with a virtual network function of the network virtualization chain. The controller receives the packet after being forwarded to the network virtualization chain and parses and analyzes the midpoint compressed data in the received packet.

Figure 3:
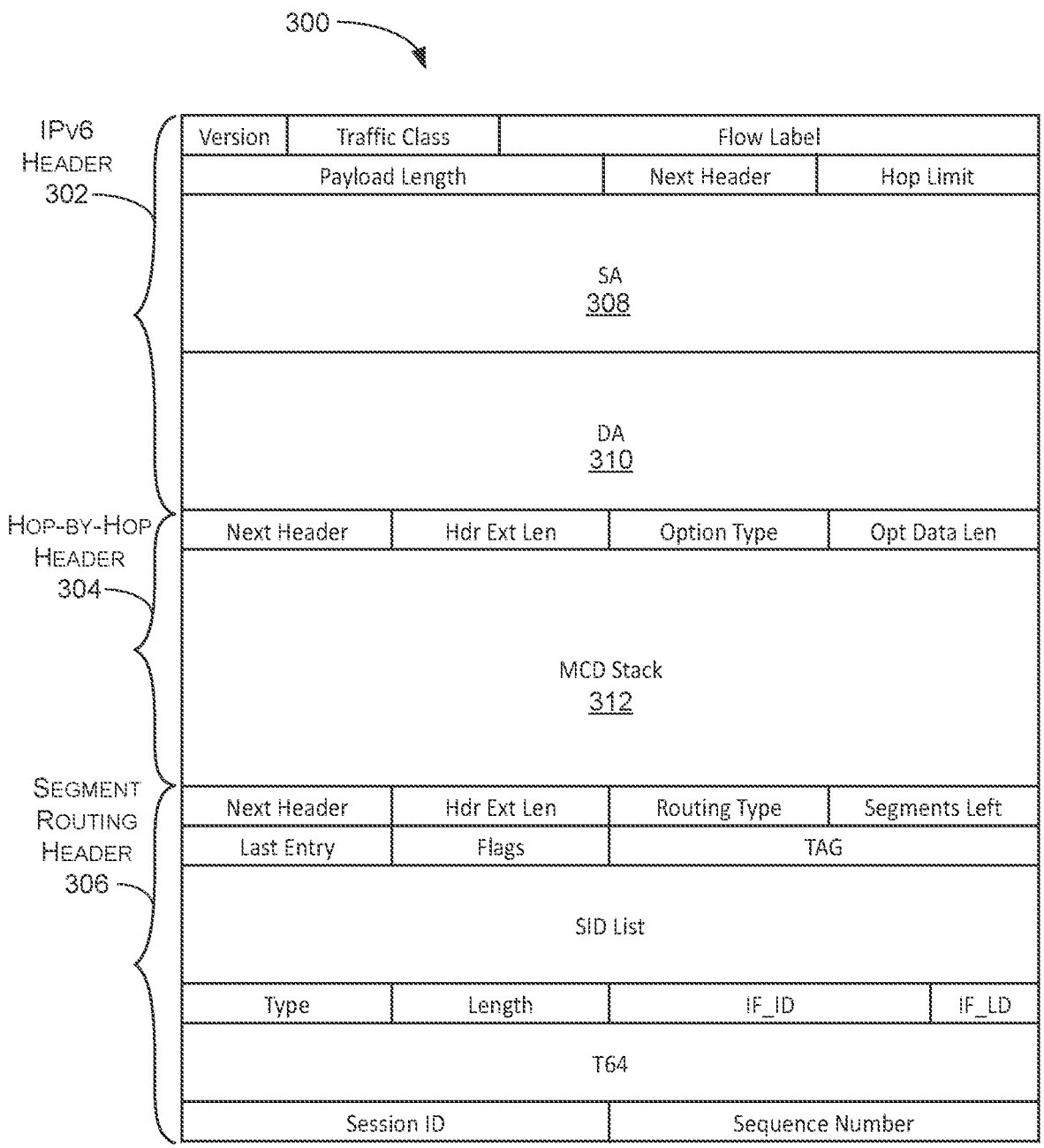
FIG. 3 shows an example of a path tracing packet according to an embodiment.

FIG. 3 shows a packet format 300 of a Path Tracing Packet according to an embodiment. The packet format 300 includes an IPv6 Header 302, a Hop by Hop (HbH) header 304, and a Segment Routing Header (SRH) 306. The IPv6 Header 302 includes fields for Version, Traffic Class, Flow Label, Payload Length, Next Header, and Hop Limit. The IPv6 Header 302 also includes a field for Source Address 308, and Destination Address 310. The Segment Routing Header 306 can include a Next Header Field, Header Extension length field, a Routing Type field, and Segments Left field. The Segment Routing Header 306 can also include a Last Entry field; a Flags field; a TAG field; a Source ID (SID) List; a Type field; a Length field; an IF ID field; an IF LD field, a T64 field; a session ID field; and a Sequence Number field.

IPv6 Hop-by-Hop path tracing option can be used for path tracing. It contains a stack of MCDs, for collecting path tracing data. The Hop-by-Hop Header 304 includes fields for Next Header, Header Extension Length; Option Type, and Option Data Length. The HbH Header 304 also includes a field or fields for a uniquely configured, Midpoint Compressed Data Stack (MCD Stack) 312.

In Path Tracing, every Path Tracing Midpoint on the path records its Midpoint Compressed Data (MCD). The MCD contains outgoing interface ID, outgoing timestamp and outgoing interface Load. For the Network Function Virtualization use-case, the Network Function Virtualization node uses the Wide Local PT ID (WL-PT-ID) to record the following information: (1) NFV-NODE ID, which is the ID of the NFV node (or SRv6 proxy) where the NFV chain is deployed; (2) NFV-IN-TS, which is a timestamp at which the SRv6 packet is received at the NFV node (or SRv6 proxy) where the NFV Chain is deployed; (3) the NFV-OUT-TS, which is the timestamp at which the SRv6 packet has completed the NFV chain and leaves the NFV node where the NFV chain is deployed; (4) the NFV-IN-PT-ID, which is the PT IFACE ID through which the packets are sent to the first VNF in the NFV chain; and (5) NFV-OUT-PT-ID, which is the path tracing IFACE ID through which the packets are received from the last Virtual Network Function of the Network Function Virtualization Chain.

FIG. 4 shows a format of the MCD stack 312 in greater detail according to an embodiment. The MCD stack 312 can include multiple stack layers such as MCD 402, MCD2 404 . . . MCDn 406. The first layer 402 of the MCD stack 312 can have a first field 408 (e.g. in an X location) which when given a predetermined value indicates that the path tracing packet 204 is to be processed according to a non-standard path tracing format. For example, the field 408 can be given a value of "0xF" indicating that the path tracing packet is to be processed by non-standard path tracing protocols. The first MCD1 layer 402 can have a second field 410, which when given certain value can indicate a particular path tracing format to be used to process the data packet. For example, a value of 0x0 in the field 410 can indicate that the path tracing packet is to be processed by a format for path tracing in a NVF chain. The Network Function Virtualization Controller 108 and NVF Node ID logic 202 previously described with reference to FIG. 2, can be configured and/or programmed to recognize and interpret values in these fields 408, 410 to process the path tracing packet accordingly.

The X1 field and the Y1 field each comprise 4 bits of data. In addition, Z1, P1, Q1, and N1 each comprise 4 bits of data. So, the fields of MCD1 together comprise only 3 bytes of data. The fields designated by Z1, P1, Q1, N1 can include a value for a Network Virtualization Node ID.

In the MCD2 layer 404 the X and Y fields (E.G. X2, Y2) can include a value for a Network Function Virtualization "IN" Timestamp (NFV-IN-TS). This is a timestamp value of the time that the packet entered the NVF chain. Fields Z2 and P2 can include a value for a Network Function Virtualization Path Tracing ID (NFV-PT-ID), this represents a path tracing ID for the first node through which the packet traversed. Fields Q2, N2 can be used for a Network Function Virtualization "OUT" path tracing ID. This is a path tracing ID indicating that the packet left the first node of the VNF chain. The collected values described with regard to MCD2, can be repeated as necessary in MCD layers MCD3, MCD4, (not shown) as needed to address all nodes of the VNF chain, until the packet leaves the NFV chain. Upon leaving the VNF chain (e.g. returning to the NFV Controller 108 (FIG. 2)), NFV chain data is collected by MCDn 406. Fields Xn, Yn, Zn collect a Path Tracing Interface ID (PT IFACE ID). Fields Pn and Qn can record an NFV "OUT" Time Stamp (NFV-OUT-TS), which indicates the time that the packet left the NVF chain and returned to the NFV Controller 108.

The data collected by the packet having the unique MCD stack 312 can, therefore, record information regarding which nodes of the NVF chain the packet traversed, but also the time taken to traverse the entire NVF chain. In addition, MCDn 406 can include "load" information in field Nn, which may include various desired data such as queuing data.

FIG. 5 illustrates a flow diagram of an example of a method 500 that illustrates aspects of the functions performed at least partly by the devices described in FIGS. 1-4. The logical operations described herein with respect to FIG. 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 is a flow diagram illustrating a method 500 for monitoring data transport in a Network Function Virtualization chain. A path tracing packet is received 502. The Path Tracing Packet can include a Midpoint Compressed Data (MCD) stack to collect path tracing information from nodes of a Network Function Virtualization (NVF) chain. The NFV node or the SRv6 Proxy is configured to records its Midpoint Compressed Data (MCD). The MCD include a Wide Local Path Tracing Identification (WL PT ID) which provides an extension to a path tracing dataplane to allow collection of proof of transit of nodes in the NFV chain. In one embodiment, the NFV network can be received and managed by a network controller which can assign a path tracing ID to a plurality of interfaces connected with a virtual network function node of the NVF chain. The network controller can include logic and/or circuitry to assign a path tracing ID to a plurality of interfaces connected with nodes of the NFV chain; retrieve the path tracing information from the path tracing packet after being passed through the NFV chain; and parse and analyze midpoint compressed data collected by the retrieved data packet.

The path tracing packet is passed through one or more nodes of an NFV chain 504. The path tracing packet is used to collect information from one or more nodes of the NFV chain 506. The collected information is analyzed to determine which NFV nodes the path tracing packet passed through and an amount of time taken for the path tracing packet to pass through the NFV chain 508. In one embodiment, the path tracing packet includes fields for determining a "time in" timestamp, a node identification, and a "time out" timestamp of each node in the NFV chain. In one embodiment, the MCD includes fields for collecting information that can include: a network function virtualization chain "in" time stamp; a network function virtualization chain "in" path tracing identification (ID); a network function virtualization chain "out" path tracing identification (ID); and/or a network function virtualization chain "out" time stamp. In one embodiment, the path tracing packet includes a Midpoint Compressed Data (MCD) stack that includes further midpoint compressed data for collecting information regarding network virtualization function nodes through which the packet passed.

In one embodiment, the second field indicates that the path tracing format includes determining a queue for one or more devices of the Network Virtualization Function chain. In one embodiment, the path tracing packet includes fields for determining a time in timestamp, a node identification, and a time out timestamp. In one embodiment, the Midpoint Compressed Data includes fields for collecting: a network function virtualization chain "IN" time stamp; a network function virtualization chain "IN" path tracing identification (ID); a network function virtualization chain "OUT" path tracing identification (ID); and a network function virtualization chain "OUT" timestamp. In one embodiment, the midpoint compressed data can be part of a midpoint compressed data stack that includes further midpoint compressed data for collecting information regarding network virtualization function through which the packet has passed. In one embodiment, the NFV network can be managed by a network controller which assigns path tracing ID to a plurality of interfaces connected with a virtual network function of the network virtualization chain.

FIG. 6 is a computing system diagram illustrating a configuration for a data center 600 that can be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, the any type of networked device described herein. Although described as servers, the server computers 602 may comprise any type of networked device, such as servers, switches, routers, hubs, bridges, gateways, modems, repeaters, access points, etc.

The server computers 602 can be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 602A-602F in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute one or more application containers and/or virtual machines to perform techniques described herein.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
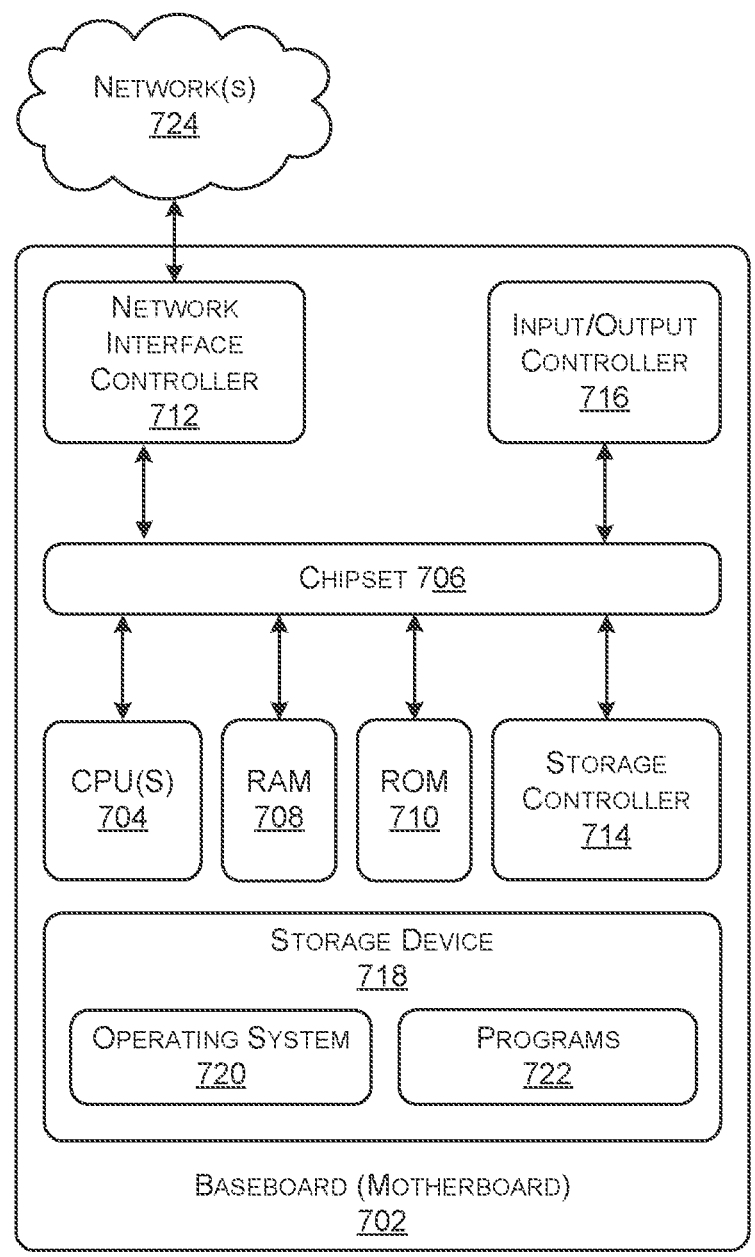
FIG. 7 is a computer architecture diagram showing an illustrative computer hardware architecture for implementing a computing device that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 602 may, in some examples, correspond to a physical server, and may comprise networked devices such as servers, switches, routers, hubs, bridges, gateways, modems, repeaters, access points, etc.

The computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the computer 602 to other computing devices over the network 608. It should be appreciated that multiple NICs 712 can be present in the computer 602, connecting the computer to other types of networks and remote computer systems.

The computer 602 can be connected to a storage device 718 that provides non-volatile storage for the computer. The storage device 718 can store an operating system 720, programs 722, and data, which have been described in greater detail herein. The storage device 718 can be connected to the computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 602. In some examples, the operations performed by devices in the distributed application architecture, and or any components included therein, may be supported by one or more devices similar to computer 602. Stated otherwise, some or all of the operations performed by the distributed application architecture, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-5. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

As described herein, the computer 602 may comprise one or more of a router, load balancer and/or server. The computer 602 may include one or more hardware processors 704 (processors) configured to execute one or more stored instructions. The processor(s) 704 may comprise one or more cores. Further, the computer 602 may include one or more network interfaces configured to provide communications between the computer 602 and other devices, such as the communications described herein as being performed by the router, load balancer and/or server. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for providing a distributed application load-balancing architecture that is capable of supporting multipath transport protocol. That is, the computer 602 may comprise any one of the routers, load balancers, and/or servers. The programs 722 may comprise any type of program that cause the computer 602 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for monitoring data transport in a network function virtualization (NFV) network, the method comprising:
   receiving, at a node, a path tracing packet having a Midpoint Compressed Data (MCD) stack to collect load information for interfaces for nodes of an NIN chain, wherein the MCD stack of the path tracing packet contains a Wide Local Path Tracing Identification (WL PT ID) indicating that the path tracing packet is configured to collect the load information;
   passing the path tracing packet through the NFV chain;
   using the path tracing packet to collect the load information from the nodes of the NFV chain; and
   analyzing the load information to determine interface loads on interfaces of the nodes the path tracing packet passed through.

2. The method of claim 1, wherein the WL PT ID provides an extension to a path tracing dataplane to allow collection of the interface loads, wherein the WL PT ID includes a field comprising one or more bits that indicate an interface load value for a particular node of the NFV chain.

3. The method of claim 1, wherein the path tracing packet includes fields for determining a node identification, a time in timestamp, an interface load value, and a time out time stamp of the nodes in the NFV chain.

4. The method of claim 1, wherein load information includes queueing data for a particular node of the NFV chain.

5. The method of claim 1, wherein the load information indicates amounts of traffic load on egress interfaces of each of the nodes in the NFV chain.

6. The method of claim 1, wherein the NFV network is managed by a network controller which:
   assigns a path tracing identifier (ID) to a plurality of interfaces connected with the nodes of the NFV chain;
   receives the load information collected in the path tracing packet after being passed through the NFV chain; and
   parses and analyzes a set of midpoint compressed data collected in the path tracing packet.

7. The method of claim 1, wherein the MCD stack comprises 12 bits of Path Tracing Interface ID (PT IFACE ID), 8 bits of Truncated Timestamp (TTS), and 4 bits of Interface Load.

8. A system comprising:
   one or more processors; and
   one or more non-transitory computer-readable media storing computer-executable instructions that, when executed by the one or more processors, cause the one or more processors to perform operations comprising:
   receiving, at a node associated with a network function virtualization (MN) network, a path tracing packet having a Midpoint Compressed Data (MCD) stack to collect load information for interfaces for nodes of an NFV chain, wherein the MCD stack of the path tracing packet contains a Wide Local Path Tracing Identification (WL PT ID) indicating that the path tracing packet is configured to collect the load information;
   passing the path tracing packet through the NFV chain;
   using the path tracing packet to collect the load information from the nodes of the NFV chain; and
   analyzing the load information to determine interface loads on interfaces of the nodes the path tracing packet passed through.

9. The system of claim 8, wherein the WL PT ID provides an extension to a path tracing dataplane to allow collection of the interface loads, wherein the WL PT ID includes a field comprising one or more bits that indicate an interface load value for a particular node of the NFV chain.

10. The system of claim 8, wherein the path tracing packet includes fields for determining a node identification, a time in timestamp, an interface load value, and a time out time stamp of the nodes in the NFV chain.

11. The system of claim 8, wherein load information includes queueing data for a particular node of the NFV chain.

12. The system of claim 8, wherein the load information indicates amounts of traffic load on egress interfaces of each of the nodes in the NFV chain.

13. The system of claim 8, wherein the NFV network is managed by a network controller which:
   assigns a path tracing identifier (ID) to a plurality of interfaces connected with the nodes of the NFV chain;
   receives the load information collected in the path tracing packet after being passed through the NFV chain; and
   parses and analyzes a set of midpoint compressed data collected in the path tracing packet.

14. The system of claim 8, wherein the MCD stack comprises 12 bits of Path Tracing Interface ID (PT IFACE ID), 8 bits of Truncated Timestamp (TTS), and 4 bits of Interface Load.

15. One or more non-transitory computer-readable media storing computer-executable instructions that, when executed by one or more processors, cause the one or more processors to perform operations comprising:
   receiving, at a node associated with a network function virtualization (NFV) network, a path tracing packet having a Midpoint Compressed Data (MCD) stack to collect load information for interfaces for nodes of an NFV chain, wherein the MCD stack of the path tracing packet contains a Wide Local Path Tracing Identification (WL PT ID) indicating that the path tracing packet is configured to collect the load information;
   passing the path tracing packet through the NFV chain;
   using the path tracing packet to collect the load information from the nodes of the NFV chain; and
   analyzing the load information to determine interface loads on interfaces of the nodes the path tracing packet passed through.

16. The one or more non-transitory computer-readable media of claim 15, wherein the WL PT ID provides an extension to a path tracing dataplane to allow collection of the interface loads, wherein the WL PT ID includes a field comprising one or more bits that indicate an interface load value for a particular node of the NFV chain.

17. The one or more non-transitory computer-readable media of claim 15, wherein the path tracing packet includes fields for determining a node identification, a time in timestamp, an interface load value, and a time out time stamp of the nodes in the NFV chain.

18. The one or more non-transitory computer-readable media of claim 15, wherein load information includes queueing data for a particular node of the NFV chain.

19. The one or more non-transitory computer-readable media of claim 15, wherein the load information indicates amounts of traffic load on egress interfaces of each of the nodes in the NFV chain.

20. The one or more non-transitory computer-readable media of claim 15, wherein the MCD stack comprises 12 bits of Path Tracing Interface ID (PT IFACE ID), 8 bits of Truncated Timestamp (TTS), and 4 bits of Interface Load.

* * * * *